(No Model.)
C. C. THOMPSON.
FISH TRAP.
No. 584,833. Patented June 22, 1897.
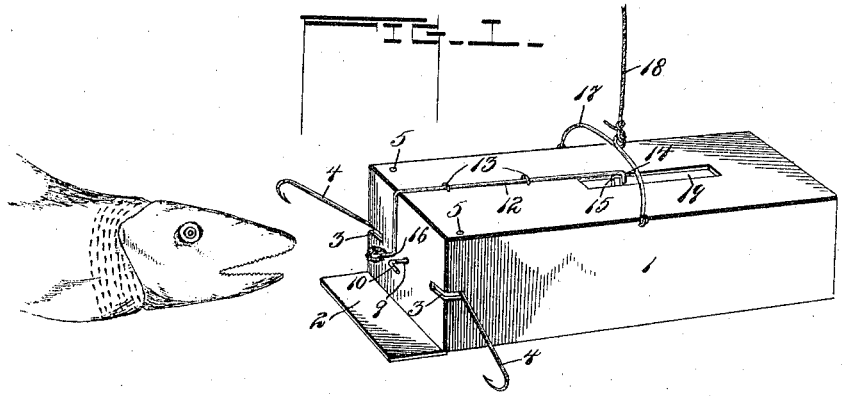
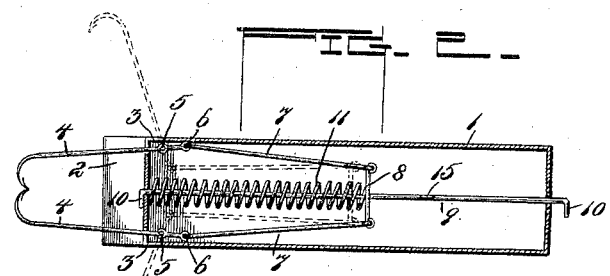
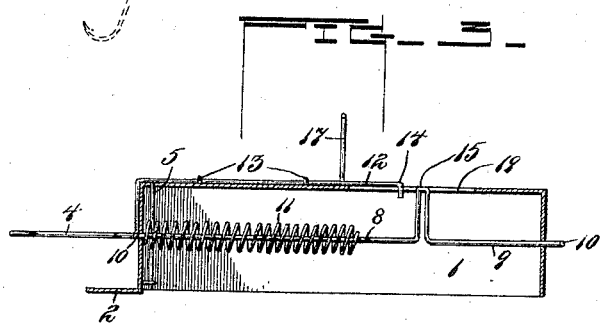
Witnesses
Milton O'Connell
R. M. Smith
Inventor
Christopher C. Thompson,
By his Attorneys,
C. A. Snow & Co.

UNITED STATES PATENT OFFICE.

CHRISTOPHER C. THOMPSON, OF GRAYSON, KENTUCKY.

FISH-TRAP.

SPECIFICATION forming part of Letters Patent No. 584,833, dated June 22, 1897.

Application filed November 3, 1896. Serial No. 610,967. (No model.)

*To all whom it may concern:*

Be it known that I, CHRISTOPHER C. THOMPSON, a citizen of the United States, residing at Grayson, in the county of Carter and State of Kentucky, have invented a new and useful Fish-Trap, of which the following is a specification.

This invention relates to fish-traps, and has for its object to provide a simple, cheap, and efficient trap in which spring-actuated hooks are employed and arranged in such relation to the bait-holder and other parts of the device as to insure the capture of a fish as soon as the bait is touched.

With the above object in view the invention consists in an improved fish-trap embodying certain novel features and details of construction and arrangement of parts, as hereinafter fully described, illustrated in the drawings, and incorporated in the claims.

In the accompanying drawings, Figure 1 is a perspective view of a fish-trap constructed in accordance with this invention. Fig. 2 is a horizontal longitudinal section through the same, looking down. Fig. 3 is a vertical longitudinal section through the same.

Similar numerals of reference designate corresponding parts in the several figures of the drawings.

Referring to the drawings, 1 designates the frame of the trap, which is shown for convenience as in the form of a rectangular box with the lower side omitted or left open, although it will be apparent that the form of said frame may be changed without affecting the essential features of the invention. At the bottom edge of the front end of the trap is an apron 2, the purpose of which will hereinafter appear. Slots 3 are formed in the opposite forward corners of the frame for allowing the vibration of a pair of oppositely-disposed hooks 4, the pointed and barbed ends of which project outside of the frame, the inner ends extending within the frame and being fulcrumed on pins 5, near the side walls of the frame and adjacent to the front corners thereof.

The shanks of the hooks 4 are extended back of the pivot-pins 5 and are provided at their extremities with eyes 6, connected to which are rods or wires 7, which extend longitudinally within the frame or case and connect pivotally at their opposite ends to a cross-bar 8 on a longitudinal slide 9. The slide 9 is formed for convenience from a piece of wire and extends straight through the frame and also through openings in the end walls thereof, the extremities of said slide being bent or hooked, as indicated at 10, to prevent the displacement of the slide. The slide is actuated rearwardly by means of a coiled spring 11, which is interposed between the cross-bar 8 and the front end of the frame, said spring acting by its expansive force to throw the points of the hooks 4 toward each other, as shown in Fig. 2.

12 designates a bait-holder which is constructed by preference from a piece of wire, the same being loosely mounted in eyes 13 on the top of the frame and provided at its rear end with a hook or projection 14, adapted to engage with an upward projection 15 on the slide 9 for holding said slide in its forward position, in which position the hooks 4 project in opposite directions from the sides of the frame, as shown in full lines in Fig. 1 and in dotted lines in Fig. 2. The forward end of the bait-holder is bent downward in front of the frame 1, and its extremity is hooked or bent, as indicated at 16, to receive the bait. (Shown in Fig. 1.)

17 represents a bail having a central eye for the attachment of the line 18, by which the trap may be raised and lowered.

19 is a longitudinal slot in the top of the frame, permitting the reciprocation of the projection 15, the upper end of which projects outside of the frame for engagement with the coöperating projection on the bait-holder.

To set the trap, the slide 9 is pushed forward and the bait-holder 12 rocked until it engages with the projection 15 of the slide, thus holding the latter forward, with the hooks 4 projecting in opposite directions from the sides of the trap, as shown in Fig. 1. After the bait has been placed upon the holder the trap is lowered by the line 18 to the bed of the stream or any desired distance in the water. Should the trap happen to rest upon a stone or other projection, the apron 2 will prevent the fish from poking his head upward and securing the bait without being caught by the hooks 4. As soon as the fish grasps the bait the holder 13 will be moved or rocked sufficiently to disengage the projections 14 and 15, and this will allow the spring 11 to act, whereupon the hooks 4 will be thrown quickly together, thus catching and securely holding the fish.

The trap above described is very simple and cheap in construction and will be found efficient and reliable in use. It will be apparent that the same is susceptible of changes in the form, proportion, and minor details of construction, which may be accordingly resorted to without departing from the spirit or sacrificing any of the advantages of this invention.

Having thus described the invention, what is claimed as new is—

1. The combination of a frame, oppositely-disposed hooks, a slide mounted on the frame and provided with a projection, a spring disposed on the slide and actuating the same, connections between the hooks and the slide, and a bait-holder mounted on the frame, provided with a projection for engaging that of the slide and arranged to support a bait between the hooks, substantially as described.

2. The combination of a frame, oppositely-disposed spring-actuated hooks, a bait-holder arranged to release and hold the hooks, and an apron located beneath the bait-holder and forming a shield to prevent fish from attacking the bait from below, substantially as and for the purpose described.

3. The combination of a box-shaped frame provided at its front corners with horizontal slots, and having a horizontal apron extending forward from the bottom of its front end, oppositely-disposed hooks arranged to vibrate in the said slots, a spring for actuating the hooks to close the same, and a bait-holder mounted on the frame and extending rearward from a point between the hooks, said bait-holder having connection with said hooks, whereby it is adapted to hold and release the same, substantially as described.

4. The combination with a box-shaped frame provided with slots as described, of oppositely-disposed hooks projecting through said slots and having their inner ends arranged within the frame, a slide passing through the frame and having its ends bent or hooked outside thereof to prevent displacement, a cross-bar on said slide, connections between said cross-bar and the hooks, an expansive spring interposed between said cross-bar and the frame, a projection on said slide extending outside of the frame, and a bait-holder arranged to support the bait between the hooks and provided with a projection for engaging the projection on the slide, said bait-holder being mounted in eyes on the frame, substantially as described.

5. The combination with a box-shaped frame provided with an apron as described, of spring-actuated hooks pivotally mounted in the frame, and a bait-holder arranged to support the bait between said hooks and over the apron and having connection with said hooks whereby it is adapted to hold and release the same, substantially as described.

In testimony that I claim the foregoing as my own I have hereto affixed my signature in the presence of two witnesses.

CHRISTOPHER C. THOMPSON.

Witnesses:
  J. G. AULT,
  WINFIELD SCOTT.